July 28, 1953  G. P. WAGNER  2,646,962
FLUID MOTOR FOR DRIVING ROTARY TOOLS
Filed Feb. 19, 1947  4 Sheets-Sheet 1
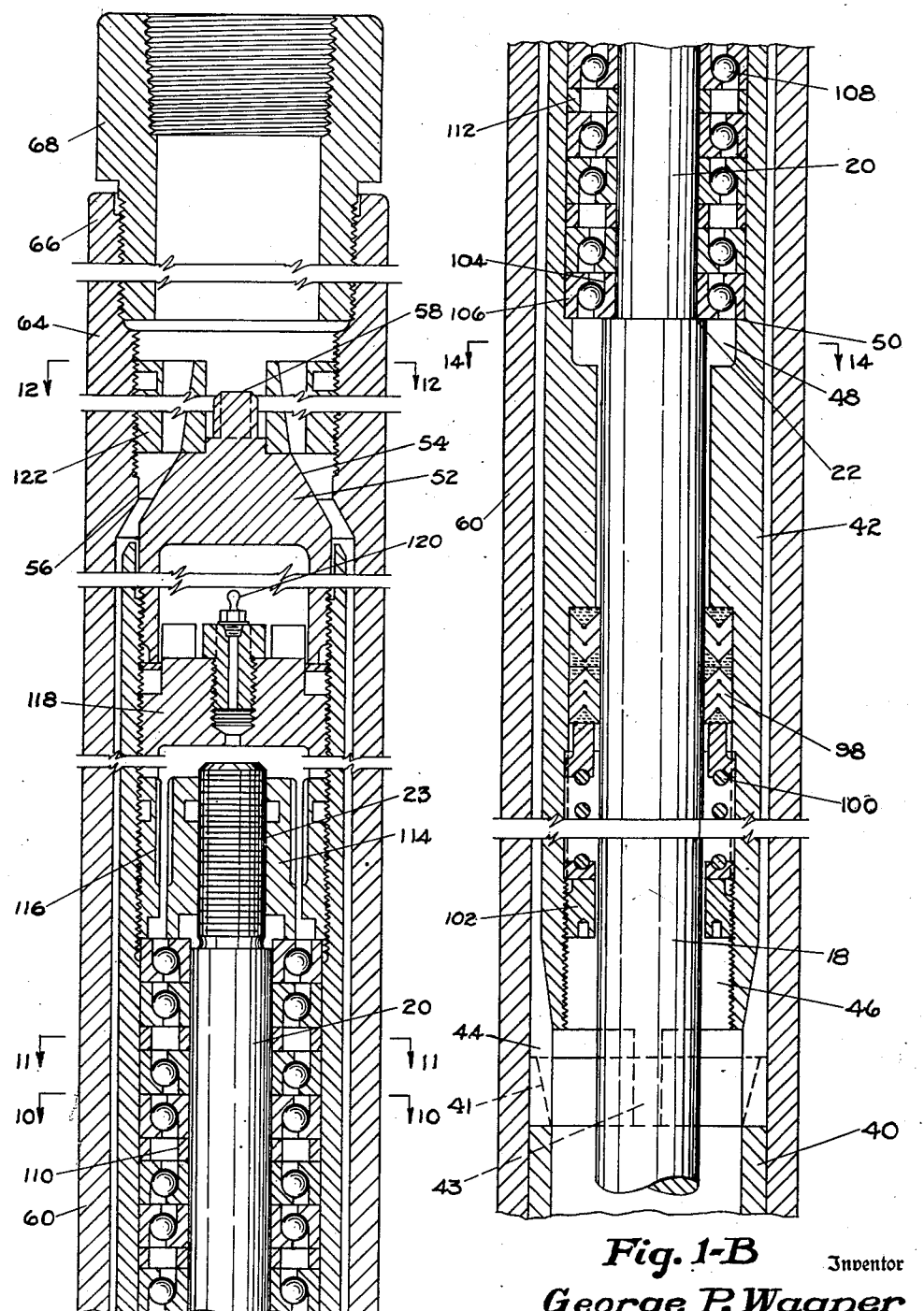
Fig. 1-A
Fig. 1-B
Inventor
George P. Wagner
By Bailey, Stephens & Huettig
Attorney July 28, 1953  G. P. WAGNER  2,646,962
FLUID MOTOR FOR DRIVING ROTARY TOOLS
Filed Feb. 19, 1947  4 Sheets-Sheet 2
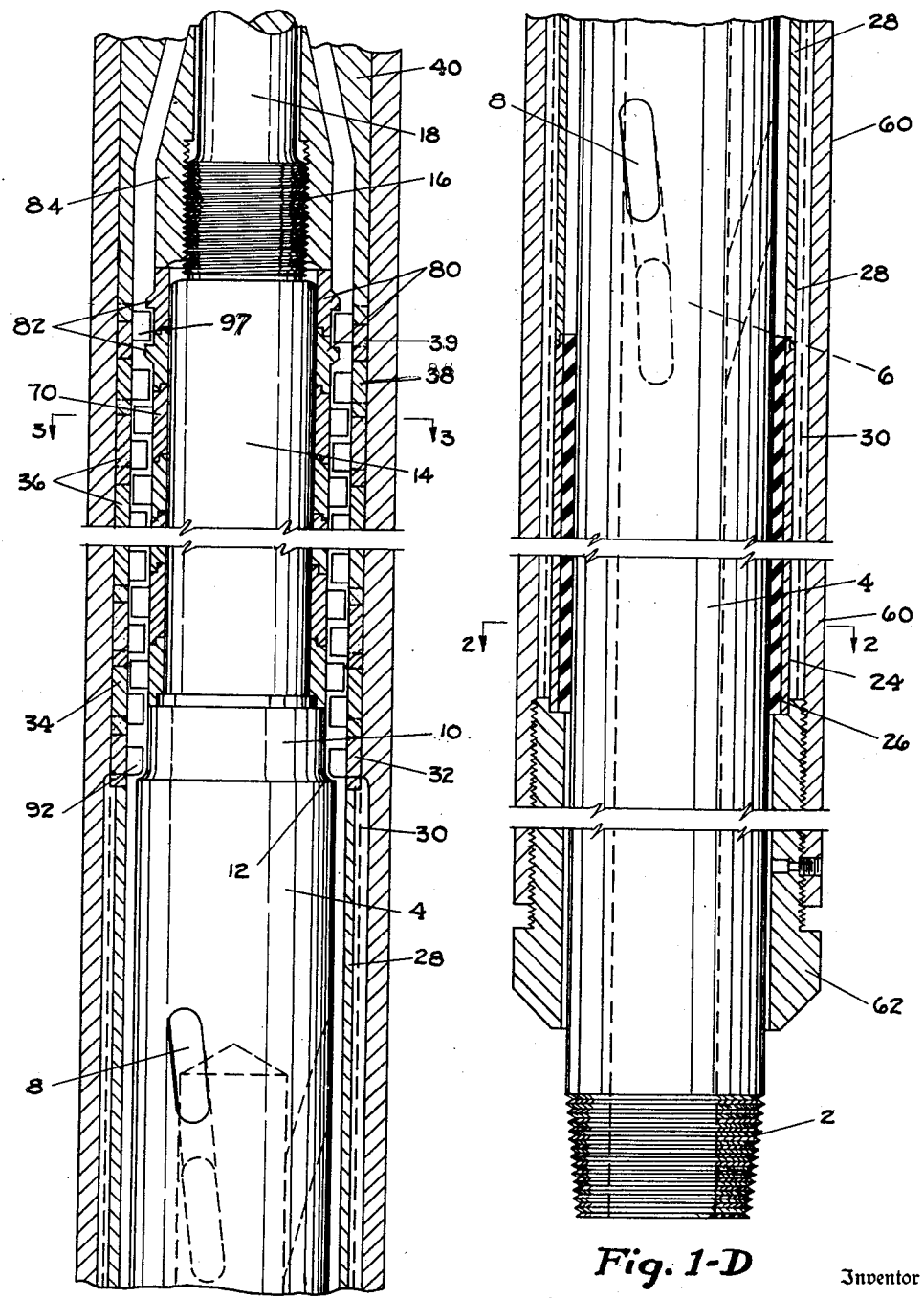
Fig. 1-C
Fig. 1-D
Inventor
George P. Wagner
By Bailey, Stephens & Huettig
Attorney July 28, 1953 G. P. WAGNER 2,646,962
FLUID MOTOR FOR DRIVING ROTARY TOOLS
Filed Feb. 19, 1947 4 Sheets-Sheet 3

Inventor
George P. Wagner
By Bailey, Stephens & Huettig
Attorney

July 28, 1953            G. P. WAGNER            2,646,962
FLUID MOTOR FOR DRIVING ROTARY TOOLS Filed Feb. 19, 1947                                        4 Sheets-Sheet 4

Inventor
George P. Wagner
By Bailey, Stephens & Huettig
Attorney

Patented July 28, 1953

2,646,962

UNITED STATES PATENT OFFICE 2,646,962

FLUID MOTOR FOR DRIVING ROTARY TOOLS

George P. Wagner, Mount Vernon, N. Y., assignor to The Engineering Development Company, Incorporated, Dallas, Tex., a company of Texas Application February 19, 1947, Serial No. 729,613

25 Claims. (Cl. 253—2)

The invention relates to oil well drilling devices, and more especially to turbine operated devices of this sort.

In the past constructions have been tested for drilling oil wells in which a turbine at the bottom of the well is operated by the drilling mud to drive the bit. Such devices have been impractical and uneconomical for a number of reasons. In the first place, they have been difficult to assemble and disassemble, so that the replacement of defective parts in the field requires special equipment and much time and labor, so that the tool is idle much of the time. The bearing arrangements for the turbine rotor have either been so complicated as to make the cost of making and servicing the tool exorbitant or so poorly protected from the drilling mud as to wear out after a short period of use. As a result, and despite the advantages to be gained from the use of a turbine drill, such devices have not replaced the ordinary rotary types.

The primary object of the present invention is to provide an oil well drilling tool of the turbine type which is practical and economical. More particularly, the invention provides a tool which can be readily assembled and disassembled, even by relatively unskilled labor, and without the use of special tools. This is a particular problem in turbine devices in which stator and rotor rings alternate along the turbine with their blades overlapping, as they do in the present device.

In relation to this object, the invention contemplates a construction in which the turbine assembly can be put together outside the outer casing, after which the casing is slipped over the assembled structure. The tool is so made that the rotor blades are secured on the rotor during assembly, while the stator blades are secured within the outer casing when the casing is slipped over the turbine, without the need for extending tools deep into the casing to secure the stator blades therein. More especially, the invention contemplates the arrangement of several parts around the turbine rotor shaft to form a sleeve over which the outer casing can be slipped, the stator blade carrying members forming parts of this sleeve. One or more of the sleeve parts are supported coaxially on the shaft, and the other parts are connected thereto in such a way that they cannot move either transversely or circumferentially of the shaft, so that the different parts of the sleeve remain properly aligned during the assembling operation. Preferably the lowermost section of the sleeve is keyed within the casing, so that there is no need for keyways or other connections between the remainder of the sleeve and the interior of the casing.

Another object of the invention is to provide a novel and efficient bearing arrangement for an oil well drilling turbine in which the bearings are kept lubricated for long periods and are not exposed to the drilling mud. This is accomplished by having the bearing completely sealed above, and packed below, so that mud can only enter from below, with means for supplying substantial amounts of additional lubricant to the bearing before any water or mud can reach it. This means involves the use of no moving parts, so that no structural problem is involved. It is accomplished by providing a grease reservoir between the packing and the bearing, so that any fluid which may work up through the packing will only force grease from this reservoir into the bearing and cannot itself reach the bearing until the grease in the reservoir is exhausted. In the specific form, the sleeve heretofore referred to is sealed off across the top of the rotor shaft, and the reservoir is a chamber between the shaft and the sleeve just below the bearing assembly.

A further object of the invention is to provide a radial and thrust bearing unit which does not heat up unduly in operation. Because the turbine is long and narrow, a substantial number of ball bearing units are required to sustain the thrust on the bit. If these units are placed within too small a space, they tend to develop heat which is likely to interfere with proper lubrication and to cause failure of the bearing. The invention contemplates the use of a substantial number of bearing units, communicating with each other for common lubrication, with specially designed spacers between certain bearings or groups of bearings, these spacers permitting passage of lubricant through all the bearing units. Such a structure will prevent overheating of the bearings, and will increase the life of the tool.

In a tool having a series of alternating sets of rotor and stator blades, any shifting of one set longitudinally will cause the blades to interfere with each other, which will prevent operation of the turbine and generally will break the blades. Still another object of the invention is to provide retaining arrangements, preferably at one or both ends of the blade section of the turbine, which will ensure the proper location of the blades during assembly and will prevent thereafter any longitudinal displacement, without interfering with the operation of the turbine.

In assembling a packing device as described herein below a bearing and within a sleeve, access to the packing for the purpose of tightening it on the shaft may be necessary. An additional object of the invention is to provide such access, by making the shaft section on which the packing is applied considerably longer than the packing, so that the lower end of the sleeve part which contains the packing may be held on the upper portion of such shaft section, spaced from the next lower sleeve part, while the packing is tightened through its lower open end; and thereafter slid downwardly on the shaft and interlocked with the next lower sleeve part.

Further objects and advantages of the invention will appear more fully from the following description, particularly when taken in conjunction with the accompanying drawings which form a part thereof.

In the drawings:

Figs. 1A, 1B, 1C and 1D are successive parts, from top to bottom, of an oil well drilling turbine embodying my invention in cross-section;

Figure 2:
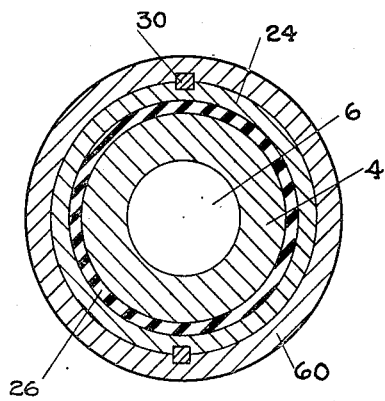
Fig. 2 is a cross-section on the line 2—2 of Fig. 1D.

The turbine device shown herein is intended to be connected to the lower end of a drill pipe, and to carry at its lower end a drill bit, or drill collars to which a drill bit is attached. The turbine is operated by the drilling mud pumped downwardly through the drill pipe.

Referring to the drawings, the device consists in general of a shaft, constituting the rotor of the turbine, and a sleeve and casing forming the stator. The shaft has at its lower end a threaded section 2 for receiving a drill bit or drill collar, and above this a part 4 of maximum cross-section. Within these two parts is a bore 6 opening at the lower end of the shaft, and communicating through openings 8 with the outside of shaft section 4 near its upper end. Above section 4 is a section 10 of reduced diameter, forming a shoulder at 12, this shoulder being rounded. Above this a further reduced section 14, which forms the rotor blade carrying section. The next section 16 is further reduced and externally threaded. Section 18 next above is the packing section and is preferably still further reduced. The succeeding bearing section 20 is of still smaller cross-section, forming a shoulder at 22. Upper end section 23 is of least cross-section and is threaded.

The sleeve is formed of a number of interlocked parts. The lowest part is shown at 24, and surrounds a part of shaft section 4 below openings 8. This sleeve part carries a radial bearing 26 fitting tightly around shaft section 4, and thus rotatably supporting the lower end of the shaft. This is preferably a rubberized bearing, or some other type which is resistant to erosion by the drilling mud. The next sleeve part 28 has at its lower end a flange mating with the flange on the upper end of part 24, and projections extending into notches in part 24. Secured on the outside of parts 24 and 28 are longitudinally extending keys 30.

At the upper end of sleeve part 28 is a stator retainer ring 32 forming a part of the sleeve; then a stator output ring 34; then a series of stator blade rings 36; then a stator input ring 38; and a stator retainer ring 39. These constitute the stator blade section of the turbine, and their detailed construction will be discussed below. Each part is interlocked with the next lower part against movement either transversely or circumferentially of the shaft and all form parts of the sleeve.

Above ring 39 is a connecting sleeve part 40, the inner diameter of which is reduced towards its upper end. There it is in turn interlocked with the packing and bearing sleeve part 42. This is accomplished in the manner shown in Fig. 1B. The inner wall of sleeve part 40 is tapered as at 41, and has notches into which fit projections 43 from sleeve part 42. These projections are somewhat longer than the depth of the notches, so that communication is provided at this point between the outside of sleeve part 42 and the interior of sleeve part 40.

Sleeve part 42 has on its outer surface longitudinal ribs 44. Internally, its lower end contains a packing-receiving bore section 46 of a diameter considerably larger than that of the shaft; then a bore section only slightly greater than that of the shaft; then an enlarged bore section 48 forming a lubricant chamber; then a still further enlarged bearing-receiving bore section, forming with section 48 a shoulder at 50; and finally an internally threaded bore portion at its upper end. The top end of the sleeve is closed by a cap nut 52 threaded into this last bore portion, this nut being solid and having a conical upper surface 54 topped by a shoulder 56 and a hexagonal or other wrench-receiving top projection 58.

The casing 60, which extends from above cap nut 52 to a point below bearing 26, is formed of one piece of constant outside diameter, and throughout almost its whole length of equal inside diameter. At its lower end (Fig. 1D), it has an internally threaded bore section of slightly greater internal diameter to receive nut 62. At its upper end (Fig. 1A) is an inwardly tapering inner wall followed by an internally threaded section 64 of reduced internal diameter; and a final internally threaded section 66 into which is threaded either the drill pipe or an adapter such as 68 for receiving the end of the drill pipe.

The lower end of the casing has internal keyways for receiving keys 30 (Fig. 2) on sleeve parts 24, 28. Otherwise, the interior of the bore of the main casing part is substantially smooth.

Figure 3:
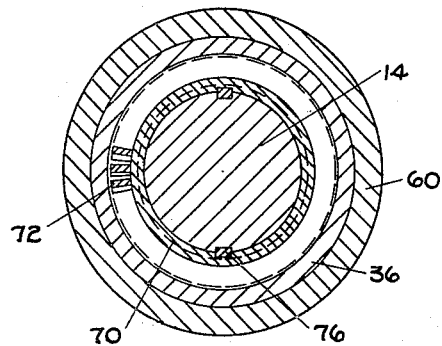
Fig. 3 is a cross-section on the line 3—3 of Fig. 1C.
Figure 4:
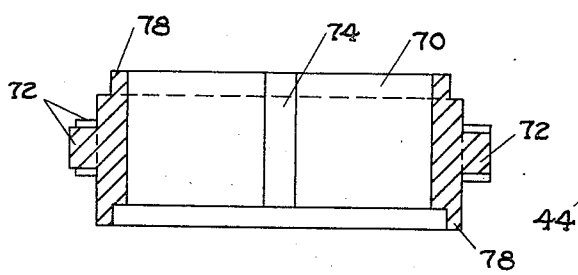
Fig. 4 is a vertical cross-section through one of the rotor blade rings.
Figure 14:
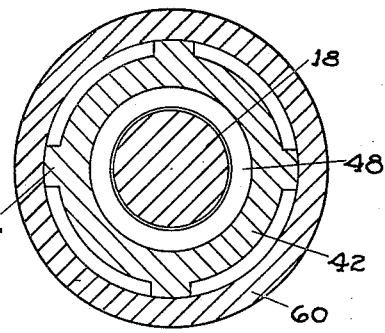
Fig. 14 is a cross-section on the line 14—14 of Fig. 1B.
Figure 5:
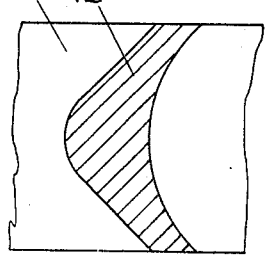
Fig. 5 is a detail cross-section showing the shape of one of the rotor blades.

The turbine section of this assembly is composed of blade-carrying rotor rings 70 secured on the shaft and the stator rings previously referred to. The rotor rings are shown in Figs. 3 to 5. Each of them has on its outer perimeter a series of turbine blades 72, and internal key-ways 74 engageable with keys 76 carried by shaft section 14. The top and bottom edges are flanged as at 78 to interfit with the previous and succeeding rings. Above these rotor rings are rotor retainer rings 80, likewise keyed to the shaft, and each carrying on its outer periphery an annular ridge 82, for a purpose to be hereinafter described. A retaining nut 84 threaded on shaft section 16 holds these rings on the shaft against the shoulder formed by the upper edge of shaft section 10. The upper end of this nut is conical, opposite the tapered internal wall of sleeve part 40, so as to leave an annular space therebetween for the passage of drilling mud.

Figure 6:
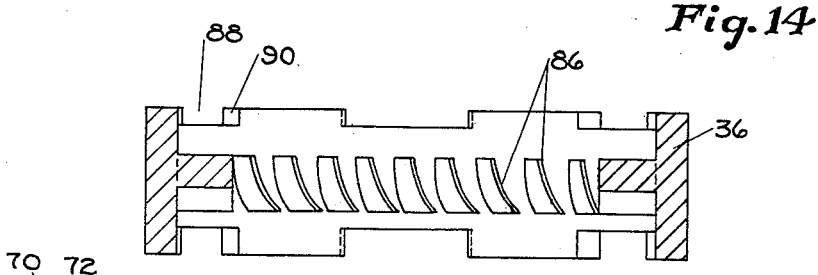
Fig. 6 is a vertical cross-section through one of the stator blade rings.
Figure 7:
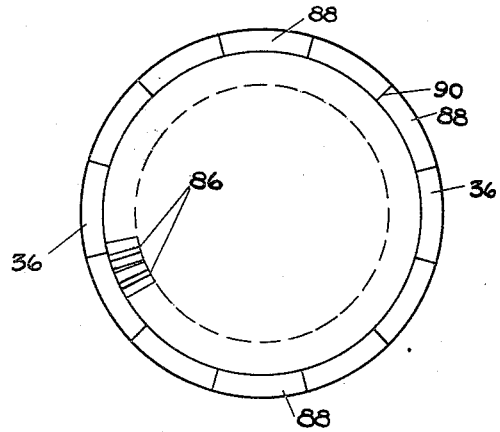
Fig. 7 is a top plan view thereof.

The stator rings 36 are shown in detail in Figs. 6 and 7. Each ring has a series of internally directed stator blades 86. Along its top and bottom edges each ring has a series of notches 88 forming projections therebetween. The edges 90 of these notches are radial to the axis of the ring. By this arrangement, when the projections of one ring are interlocked into the notches of the next ring, not only do they prevent rotation between the parts, but also they prevent movement transversely or radially of the shaft axis, so that the outer surfaces of the rings are held in alignment to form a continuous part of the sleeve once the rings are assembled.

Rings 34 and 32 are similarly interlocked with each other; as is ring 32 with sleeve part 28; lowest ring 36 with ring 34; ring 38 with upper ring 36; retainer ring 39 with ring 38; and sleeve part 40 with ring 39.

Retainer ring 32 has a series of inward projections 92 having curved lower corners opposite curved shoulder 12. These serve to prevent any substantial upward shifting of the shaft within the sleeve, yet without interfering with the rotation of the shaft. Also, during assembly, they support the upper end of sleeve part 28 in spaced, substantially coaxial relation with the shaft. The importance of this will be apparent when the assembling of the turbine is discussed.

Figure 9:
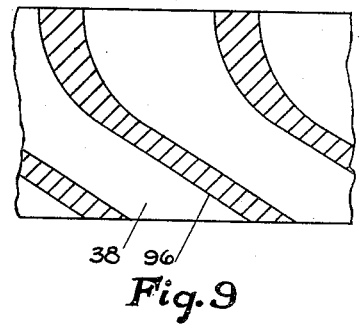
Fig. 9 is a similar view of one of the blades of the input stator ring.
Figure 8:
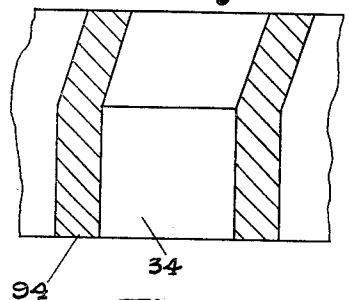
Fig. 8 is a detail cross-section through one of the blades of the output stator ring.

Output stator ring 34 has blades 94 (see Fig. 8) which receive the fluid from the lowest rotor blades and turn it to a direct downward course. Input stator ring 38 has blades 96 (see Fig. 9) which turn the fluid flowing directly down through the turbine to direct it into the first rotor blades. Stator retainer ring 39 has projections 97 located between ridges 82. This prevents longitudinal movement of the rotor blade carrying section of the shaft with respect to the sleeve in either direction, again without interfering with the rotation of the shaft. Alone, or more especially in combination with the ring 32, this arrangement ensures the proper spacing of the rotor and stator rings during assembly and prevents their shifting during operation so as to interfere with each other and be broken.

Of course, the rotor rings and stator rings alternate, and the blades occupy only slightly less than half of the vertical height of the rings, so that the parts interfit as shown in Fig. 1C.

Within bore section 46 of the sleeve part 42 (see Fig. 1B) is a packing 98 of the familiar chevron type, held in place by a coil spring 100 and nut 102 threaded in the bore.

Above lubricant chamber 48 is the radial and thrust bearing unit (Fig. 13) for the upper end of the shaft. This is designed to take care of thrust in either direction. Resting against shoulder 22 is a ring 104 fitting closely around the shaft and forming one race of a ball bearing. The opposite race 106 is fitted closely within sleeve part 42 and rests against shoulder 50. Between these two races are the balls 108. These races are so formed as to limit movement of the balls in one direction only, so that the lower units in Fig. 1A, 1B take only an upward thrust of the shaft in the sleeve. A series of these units are stacked one on the other, the upper units being reversed so as to take a downward thrust only.

Figure 11:
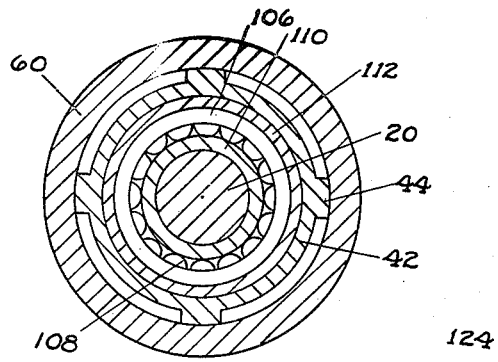
Fig. 11 is a cross-section on the line 11—11 of Fig. 1A.
Figure 12:
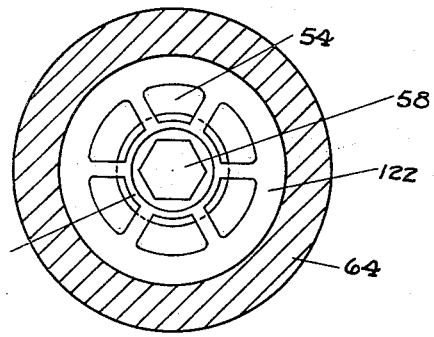
Fig. 12 is a cross-section on the line 12—12 of Fig. 1A.
Figure 13:
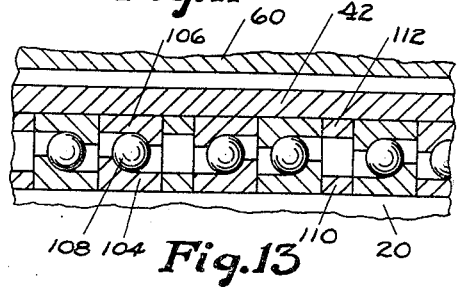
Fig. 13 is an enlarged view a part of the bearing structure of Figs. 1A and 1B.

Between some of the bearing units, for example between each two such units, are spacing rings (see Figs. 11, 13). These are inner rings 110 between successive inner races 104, fitting closely on the shaft, and outer rings 112 between outer races 106 fitting closely within the sleeve. A space is thus provided between the rings.

Inner races 104 are held in position on the shaft by a nut 114 threaded on the end 23 of the shaft. The outer races 106 are held by a nut 116 threaded within sleeve part 42. A space is provided between these two nuts communicating with the bearing assembly. Above nut 116 is a sealing nut 118 likewise threaded in sleeve part 42 and having a passage therethrough closed by a conventional grease fitting 120. Above nut 118 is nut 52 heretofore described.

Threaded in casing part 64 is a spinder 122 having a central opening capable of fitting over projection 58 and an interior ring 124 resting against shoulder 56 of nut 52. This spider, together with nut 62 which engages the lower end of sleeve part 24, holds the sleeve part against longitudinal movement in the casing when the device is assembled.

Figure 10:
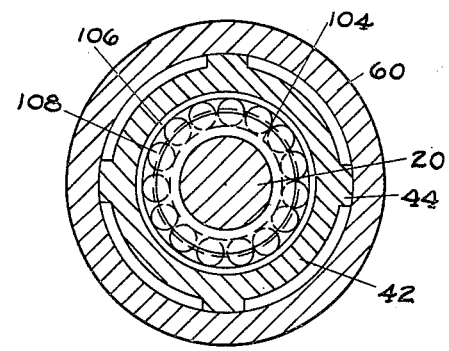
Fig. 10 is a cross-section on the line 10—10 of Fig. 1A.

The operation of the device is readily apparent. Drilling mud flows downward through adapter 68 and the upper end of the casing, through spider 122, outside of nut 52 and downward through the space formed by ribs 44 between sleeve part 42 and the casing 16 (Fig. 10). Below sleeve part 42 it passes into the interior of sleeve part 40 and past nut 84 into the blade section in which it drives the rotor blades to turn the shaft. It then flows into the space between the shaft section 4 and sleeve part 28, through openings 8 and bore 6, to the bit and thence up the outside of the drill pipe to the surface.

In assembling the turbine, the rotor shaft is supported in any suitable manner, preferably in a horizontal position. Sleeve part 24 is then slid on the shaft to its approximate final position. Next sleeve part 28 is slipped on from the upper end and interlocked with sleeve part 24 in such a position that the keys on the two sleeves are aligned. Next, ring 32 is put on and interlocked with sleeve part 28. Projections 92 will rest against shaft section 10, and with bearing 26 will support this much of the sleeve in substantially coaxial relation with the shaft.

Output stator ring 34 is now applied and interlocked with ring 32. The first rotor ring 70 is put in position by sliding it along keys 76, then the first stator ring 36 is applied and interlocked with ring 34. Alternate rotor and stator blades are then assembled until the desired number is present. While only a small number is shown, to prevent complication of the drawing, in practice from 90 to 120 of each type of ring, or even more, could be used. It will be clear that because of the special type of connection between the various stator rings, these will be so supported as to be accurately aligned coaxially with the shaft to present a smooth outer surface.

Above the last or upper rotor ring 70 are placed successively the stator input ring 38, the first rotor retainer ring 80, upper stator retainer ring 39 and the second or upper rotor retainer ring 80. Then nut 84 is screwed on tightly, and the blade section assembly is complete.

Next sleeve part 40 is applied and interlocked with ring 39. The packing 98, 100, 102 is placed in bore 46, with the nut not loosened and the packing uncompressed. In such a condition, sleeve part 42 can be slipped over the upper end of the shaft until packing 98 is on shaft section 18. Because this shaft section is substantially longer than the packing unit, the packing overlies the upper part of section 18 while there is still a substantial space between the lower end of sleeve part 42 and the upper end of sleeve part 40. Into this space a suitable wrench may be introduced to tighten up the nut 102 and compress the packing against the shaft. Sleeve part 42 is then slid down and interlocked with sleeve part 40.

The first two bearing units (104, 106, 108) are now slipped into the upper end of sleeve part 42, then a set of spacer rings 110, 112, then two more bearing units, et cetera, until the bearings are all in place. Nuts 114, 116 are screwed in, and then nut 118. A non-water-absorbent, non-emulsifying grease is then forced in under high pressure, preferably of the order of the hydraulic pressure which will exist in the turbine at the depth at which it will operate (for example, 5000 p. s. i. at 10,000 ft.), until the spaces around and between the bearings and the grease reservoir 48 are filled with grease. Nut 58 is then screwed into the upper end of sleeve part 42.

Now the assembled parts are placed in an upright position, and outer casing 60 is slid down from above over the sleeve. There is nothing to limit this downward movement until the bottom edge of the casing reaches the upper ends of keys 30. The casing is then turned until the keys meet the keyways, and can then slide down to its final position. Nut 62 is then screwed into the lower end, and spider 122 into the upper end, until they engage the sleeve between them in its proper position in the casing. Adapter 68 can then be applied, if desired.

It will be clear that with such a procedure there is no need to work deep within any hollow member in securing the parts together. The sleeve is secured against rotation by the keys at its lower end, so that the keyways inside the casing are relatively short. The whole sleeve is assembled as a self-sustaining, smoothly surfaced unit around the shaft before the casing is applied. All the turbine blade section parts are secured by mere interlocking, without bolts or screws. The assembly is thus extremely simple.

Grease reservoir 48 presents a specially desirable structure. The sleeve is sealed at the top, so that fluid from the pipe can only enter the bearing assembly from below past packing 98. But any such fluid will first encounter the grease in chamber 48, and will force this grease upward into the bearings, without itself penetrating to the bearings until the grease is exhausted. On the other hand, such an arrangement requires no pistons or other moving parts to produce this result.

For disassembling the turbine, the steps described above are reversed.

While I have described herein one embodiment of my invention, I wish it to be understood that I do not intend to limit myself thereby except within the scope of the claims hereto or hereinafter appended.

I claim:

1. In an oil well drilling turbine, a rotor structure including a shaft adapted to have a bit attached thereto, a plurality of sets of rotor blades projecting from said shaft at spaced intervals therealong, and means securing said blades against rotation on said shaft, a plurality of stator rings each having a set of inwardly directed stator blades thereon in the intervals between the sets of rotor blades, a sleeve section on the outside of said shaft, said shaft being turnable with respect to said sleeve section, connecting means between said stator rings and between one of said stator rings and said sleeve section engageable by movement longitudinally of the shaft for preventing all movement between the two connected parts transversely and circumferentially of the shaft, a casing having an internal diameter equal to the external diameter of the stator rings, and means securing said sleeve section against rotation within said casing.

2. In a device as claimed in claim 1, said connections including projections on one of the connected parts and mating notches on the adjacent connected part, said projections and notches having side edges substantially radial to the axis of the shaft.

3. In an oil well drilling turbine, a rotor structure including a shaft adapted to have a bit attached thereto, a plurality of sets of rotor blades projecting from said shaft at spaced intervals therealong, and means securing said blades against rotation on said shaft, a sleeve around said shaft, said sleeve including a first sleeve section, means supporting said sleeve section in co-axial relation with said shaft, a plurality of stator rings forming parts of said sleeve each having a set of inwardly directed stator blades thereon in the intervals between the sets of rotor blades, connections between said stator rings and between one of said stator rings and said first sleeve section engageable by movement longitudinally of the shaft, said connections preventing movement between the two connected parts transversely and circumferentially of the shaft, a second sleeve section at the opposite end of said stator rings from said first sleeve section, means connecting said second sleeve section with said stator rings to prevent relative movement between the second sleeve section and the stator rings around the axis of the shaft, a casing around said sleeve, and means to prevent rotation of the sleeve within the casing.

4. In a device as claimed in claim 3, said last means connecting said first sleeve section to said casing.

5. In a device as claimed in claim 3, said supporting means holding said first sleeve section in spaced relation to said shaft.

6. In a device as claimed in claim 3, said first sleeve section being located adjacent the lower end of the turbine, said supporting means being spaced at two different points along the sleeve and holding the sleeve section in spaced relation to the shaft to provide a passage for drilling mud, the lower supporting means substantially closing the lower end of such passage, the upper supporting means permitting access to the space between the blades, said shaft having a bore therein communicating with said passage and opening below said lower supporting means.

7. In a device as claimed in claim 6, said lower supporting means constituting a radial bearing for said shaft.

8. In an oil well drilling turbine, a rotor structure including a shaft adapted to have a bit attached thereto, a plurality of sets of rotor blades projecting from said shaft at spaced intervals therealong, and means securing said blades against rotation on said shaft, a sleeve around said shaft, said sleeve including a first sleeve section, means supporting said sleeve section in coaxial relation with said shaft, a plurality of stator rings forming parts of said sleeve each having a set of inwardly directed stator blades thereon in the intervals between the sets of rotor blades, connections between said stator rings and between one of said stator rings and said first sleeve section engageable by movement longitudinally of the shaft, said connections preventing movement between the two connected parts transversely and circumferentially of the shaft, a casing around said sleeve, and means to prevent rotation of the sleeve within the casing, said first sleeve section being located adjacent the lower end of the turbine, said supporting means being spaced at two different points along the sleeve section and holding the sleeve section in spaced relation to the shaft to provide a passage for drilling mud, the lower supporting means substantially closing the lower end of such passage, the upper supporting means permitting access to the space between the blades, said shaft having a bore therein communicating with said passage and opening below said lower supporting means.

9. In a device as claimed in claim 8, said lower supporting means constituting a radial bearing for said shaft.

10. In a device as claimed in claim 3, a radial and thrust bearing assembly between the second sleeve section and the shaft.

11. In a device as claimed in claim 10, means between the second sleeve section and the casing to hold the second sleeve section in spaced relation with the casing to provide a passage for drilling mud, said passage communicating with the space around the blades.

12. In a device as claimed in claim 11, said first sleeve section being located adjacent the lower end of the turbine, said supporting means being spaced at two different points along the first sleeve section and holding the said sleeve section in spaced relation to the shaft to provide a passage for drilling mud, the lower supporting means substantially closing the lower end of such passage, the upper supporting means permitting access to the space between the blades, said shaft having a bore therein communicating with said passage and opening below said lower supporting means.

13. In a device as claimed in claim 12, said lower supporting means constituting a radial bearing for said shaft.

14. In an oil well drilling turbine, a rotor structure including a shaft adapted to have a bit attached thereto, a plurality of sets of interlocked rotor rings having rotor blades projecting therefrom at spaced intervals therealong, and means securing said rings against rotation on said shaft, a plurality of stator rings each having a set of inwardly directed stator blades thereon in the intervals between the set of rotor blades, a casing slidable over the outside of said stator rings, means to connect said stator rings to said casing to prevent movement therebetween, and connecting means between said stator rings independent of said casing to hold said rings against all movement with respect to each other transversely and circumferentially of the shaft, whereby said stator rings can be assembled in aligned relation around the shaft outside the casing and the casing can thereafter be slid over the stator rings and shaft.

15. In an oil well drilling turbine, a rotor structure including a shaft adapted to have a bit attached thereto, a plurality of sets of rotor blades projecting from said shaft at spaced intervals therealong, and means securing said blades against rotation on said shaft, a plurality of stator rings each having a set of inwardly directed stator blades thereon in the intervals between the sets of rotor blades, means on said shaft forming a peripheral shoulder therearound, and means connected to said stator blade rings having a projection adjacent said shoulder but slightly spaced therefrom to prevent movement of said shaft longitudinally with respect to said stator rings means on said shaft forming a second peripheral shoulder on the other side of and slightly spaced from said projection.

16. In an oil well drilling turbine, a rotor structure including a shaft adapted to have a bit attached thereo, a plurality of sets of rotor blades projecting from said shaft at spaced intervals therealong, and means securing said blades against rotation on said shaft, a sleeve around said shaft, said sleeve being formed of a plurality of parts including stator rings forming parts of said sleeve each having a set of inwardly directed stator blades thereon in the intervals between the sets of rotor blades, and at least one retainer ring forming a part of said sleeve, means on said shaft forming a peripheral shoulder therearound, said retainer ring having an inward projection adjacent said shoulder but slightly spaced therefrom to prevent movement of said shaft longitudinally with respect to said stator rings.

17. In a device as claimed in claim 16, connections between successive rings engageable by movement longitudinally of the shaft, said connections preventing movement between the two connected parts transversely and circumferentially of the parts.

18. In a device as claimed in claim 3, said rotor structure including a plurality of sets of rotor rings having blades projecting therefrom arranged along said shaft, said rings holding said blades at spaced intervals along the shaft, means securing said rotor rings against rotation on said shaft, said first sleeve section being located adjacent the lower end of the turbine, said supporting means being spaced at two different points along the first sleeve section and holding the said sleeve section in spaced relation to the shaft to provide a passage for drilling mud, the lower supporting means substantially closing the lower end of such passage, the upper supporting means permitting access to the space between the blades, said shaft having a bore therein communicating with said passage and opening below said lower supporting means, and a radial and thrust bearing assembly between the second sleeve section and the shaft.

19. In an oil well drilling turbine, a rotor structure including a shaft adapted to have a bit attached thereto, a plurality of sets of rotor blades projecting from said shaft at spaced intervals therealong, and means securing said blades against rotation on said shaft, a plurality of stator rings each having a set of inwardly directed stator blades thereon in the intervals between the sets of rotor blades, a sleeve section on the outside of said shaft, said shaft being turnable with respect to said sleeve section, connections between said stator rings and between one of said stator rings and said sleeve section engageable by movement longitudinally of the shaft, a casing having an internal diameter equal to the external diameter of the stator rings, means securing the sleeve against rotation in the casing, said sleeve section being located near the lower end of the casing, a second sleeve section above said stator rings, connections between said upper sleeve section and the uppermost of the stator rings, means spacing said second sleeve section inwardly from the casing to provide a mud passage therebetween, said sleeve having an opening therethrough providing a mud passage from the exterior to the interior thereof between said second sleeve section and the upper stator ring.

20. In a device as claimed in claim 19, said second sleeve section being closed at its upper end, and a bearing for the upper end of the shaft within said second sleeve section.

21. In an oil well drilling turbine, a rotor structure including a shaft adapted to have a bit attached thereto, a plurality of sets of rotor blades projecting from said shaft at spaced intervals therealong, and means securing said blades against rotation on said shaft, a plurality of stator rings each having a set of inwardly directed stator blades thereon in the intervals between the sets of rotor blades, a sleeve section on the outside of said shaft, said shaft being turnable with respect to said sleeve section, connections between said stator rings and between one of said stator rings and said sleeve section engageable by movement longitudinally of the shaft, a casing having an internal diameter equal to the external diameter of the stator rings, means securing the sleeve against rotation in the casing, said sleeve section being located near the lower end of the casing, the shaft being integral, the portion of the shaft within the casing progressively increasing in diameter from top to bottom, a bearing between the sleeve section and the shaft closing the space therebetween, the lower end portion of the shaft having a bore opening in the lower end of the shaft, and the shaft having an opening in its wall above the bearing communicating with the bore.

22. In a device as claimed in claim 1, a member threaded in the lower end of the casing abutting against the lower end of the sleeve.

23. In a device as claimed in claim 1, said sleeve section being located near the lower end of the casing, a second sleeve section above said stator rings, connections between said upper sleeve section and the uppermost of the stator rings, means spacing said second sleeve section inwardly from the casing to provide a mud passage therebetween, said sleeve having an opening therethrough providing a mud passage from the exterior to the interior thereof between said second sleeve section and the upper stator ring.

24. In a device as claimed in claim 23, said second sleeve section being closed at its upper end, and a bearing for the upper end of the shaft within said second sleeve section.

25. In a device as claimed in claim 1, said sleeve section being located near the lower end of the casing, the shaft being integral, the portion of the shaft within the casing progressively increasing in diameter from top to bottom.

GEORGE P. WAGNER.

References Cited in the file of this patent

UNITED STATES PATENTS

| Number | Name | Date |
|---|---|---|
| 1,412,430 | Verneuil | Apr. 11, 1922 |
| 1,482,702 | Scharpenberg | Feb. 5, 1924 |
| 1,519,391 | Benson | Dec. 16, 1924 |
| 1,770,488 | Lachamp et al. | July 15, 1930 |
| 1,772,525 | Slocomb | Aug. 12, 1930 |
| 1,878,747 | Youngblood | Sept. 20, 1932 |
| 2,044,349 | Diehl | June 16, 1936 |
| 2,197,499 | Heinze | Apr. 16, 1940 |
| 2,268,543 | Coberly | Jan. 6, 1942 |
| 2,348,047 | Yost | May 2, 1944 |
| 2,353,534 | Yost | July 11, 1944 |
| 2,355,342 | Van Wormer | Aug. 8, 1944 |
| 2,427,226 | Muhlbach | Sept. 9, 1947 |